No. 772,106. PATENTED OCT. 11, 1904.
R. LANGE.
BALANCE SPRING STUD.
APPLICATION FILED MAY 13, 1904.
NO MODEL.
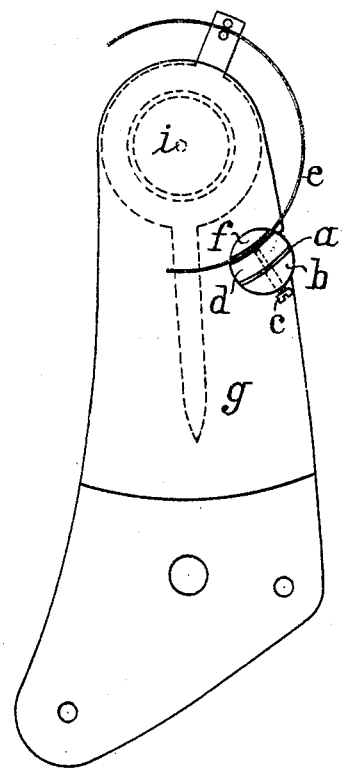
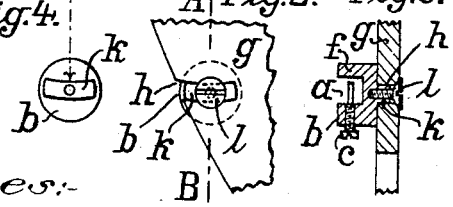
Witnesses:
Henry Thieme.
F. George Barry.
Inventor:
Richard Lange
By attorneys
Brown & Seward No. 772,106.

Patented October 11, 1904.

UNITED STATES PATENT OFFICE.

RICHARD LANGE, OF GLASHÜTTE, GERMANY.

BALANCE-SPRING STUD.

SPECIFICATION forming part of Letters Patent No. 772,106, dated October 11, 1904.

Application filed May 13, 1904. Serial No. 207,719. (No model.)

*To all whom it may concern:*

Be it known that I, RICHARD LANGE, a subject of the King of Saxony, and a resident of Glashütte, Kingdom of Saxony, German Empire, have invented new and useful Improvements in Means for Securing Balance-Springs in Watches and Clocks, of which the following is a specification.

This invention relates to means for securing balance-springs in watches and clocks.

The improved means comprise a pair of jaws one of which is movable and arranged to grip the end of the spring under the action of a screw against the other jaw, which constitutes a wall, cheek, or face of the stud.

Hitherto it has been usual to secure the balance-spring both to the collet and to the stud by means of pins. With this old arrangement, and especially in the case of cheap watches and clocks, it is necessary to remove and replace the pin and also to lay the spring flat and bring or adjust it to the proper height every time it is required to adjust the length of the spring for the purpose of regulation. By means of the present invention the said pins are entirely dispensed with.

The invention will be understood from the following description of an example thereof.

Figure 1 shows in plan a balance-cock provided with the balance-spring-clamping device according to the present invention. Fig. 2 shows the under side of the balance-cock with the means for holding the stud carrying the jaws in such cock. Fig. 3 shows a section according to line A B in Fig. 2, and Fig. 4 the stud separated from the balance-cock and showing a curved projection for inserting a fixing-screw.

In carrying out the invention according to this example a recess or groove $a$ is turned or formed in the stud $b$, and into this recess is fitted a movable jaw $d$, this being shaped to conform to the contour of the groove or recess and adapted to be moved transversely and parallel therein by means of a screw $c$ passing through the side of the stud. The groove or recess $a$ is or may be of arc shape to conform to the curve of the spring $e$. The end of the spring $e$ is inserted between this movable jaw $d$ and the fixed jaw $f$, formed by the opposite side or wall of the groove or recess $a$ in the stud $b$, and secured by tightening up the screw $c$, so as to grip the end of the spring $e$ against the fixed jaw $f$. By simply loosening the screw $c$ the spring $e$ can be adjusted to any required extent in length and as to its height. As the spring $e$ is freely movable between the loose and fixed jaws $d$ $f$, its position is not altered either laterally or as to height when the jaws are closed, but it lies flat again of itself on closing the jaws.

For securing or holding the stud $b$ in the balance-cock $g$ the latter is provided with a lateral recess $h$, the curvature of which corresponds to the circle drawn from the center $i$ of the curved groove $a$. In this recess $h$ a curved projection $k$ may be inserted, provided with a hole for receiving the screw $l$, the head of which may be a countersunk one.

In disengaging the stud $b$ from the balance-cock $g$ it is only necessary to lift the screw $l$ in such a degree that its head leaves the countersunk hole, whereupon the curved projection $k$ of the stud $b$ may be withdrawn from the recess $h$, whereas if the stud shall be secured to the balance-cock this projection is inserted to the recess $h$ and the screw is screwed down, thereby holding by its countersunk head the stud in the balance-cock.

This arrangement consequently presents important advantages over the known method of securing balance-springs by pins. In the case of Brequet springs the invention enables the small alteration of length which is frequently necessary to be readily effected; but with flat springs without overcoils in particular it permits of rapid regulation. It is no longer necessary to lay or adjust the spring flat each time; but the spring remains exactly in the circle of the curb-pins and parallel with them. The height and flat lie of the spring regulates itself automatically, and thus the regulation of the watch or clock is greatly facilitated and a large saving in time and trouble effected. Moreover, injury or distortion of the spring is obviated. In the pinning method the spring is frequently injured in the round or curve of the hole and pressed hollow or dished. Further, the pin, which generally projects, prevents the regular uncoiling movement of the spring. This drawback also is obviated by securing the spring by means of jaws, as above described. The spring is gripped for a uniform length on both sides, retains its natural position, and is not injured, distorted, or dished.

What I claim is—

1. In a device for securing balance-springs in watches and clocks, the combination with a stud having a recess therein, of a movable jaw located in said recess for receiving the spring between it and one wall of the recess and a screw inserted through the side of the stud back of the movable jaw and engaging the jaw for forcing it into clamping position.

2. In a device for securing balance-springs in watches and clocks, the combination with a balance-cock having a curved recess opening through its side, of a stud having a curved projection located in said recess, a screw engaging the cock and stud for clamping the stud to the cock, said stud having a curved recess therein corresponding to the curved recess in the cock, a movable jaw located in the stud-recess for receiving the spring between it and one wall of the recess and a screw inserted through the side of the stud back of the movable jaw for forcing the jaw into clamping position.

In testimony that I claim the foregoing as my invention I have signed my name, in presence of two witnesses, this 28th day of April, 1904.

RICHARD LANGE.

Witnesses:
ERNST C. MEYER,
GEORG HEUSSINZER.